(12) United States Patent  
Pearson

(10) Patent No.: US 8,182,108 B2
(45) Date of Patent: May 22, 2012

(54) DYNAMO LIGHT

(76) Inventor: Arthur Scott Pearson, Upland, CA (US)

(*) Notice: Subject to any disclaimer, the term of this patent is extended or adjusted under 35 U.S.C. 154(b) by 263 days.

(21) Appl. No.: 12/777,742

(22) Filed: May 11, 2010

(65) Prior Publication Data

US 2010/0220468 A1 Sep. 2, 2010

Related U.S. Application Data

(63) Continuation-in-part of application No. 29/292,276, filed on Oct. 6, 2007, now Pat. No. Des. 650,102.

(51) Int. Cl.
*F21V 33/00* (2006.01)
(52) U.S. Cl. ........ 362/109; 362/183; 362/192; 362/253; 119/796
(58) Field of Classification Search ................. 362/109, 362/183, 192–193, 253, 391; 119/796
See application file for complete search history.

(56) References Cited

U.S. PATENT DOCUMENTS

2008/0173257 A1* 7/2008 Steiner et al. ................. 119/796
2008/0271683 A1* 11/2008 Mitchell ....................... 119/796

* cited by examiner

*Primary Examiner* — Jason Moon Han
(74) *Attorney, Agent, or Firm* — Clement Cheng

(57) ABSTRACT

A retractable leash light has a light housing; and a handle formed on the light housing for handgrip. The light has an LED element and a switch. The light is connected to an electric circuit. A crank mechanism is mounted on the light housing, and the crank mechanism has a knob pivotally mounted to a crank arm of the crank mechanism. The crank mechanism also has a crank wheel mechanically connected to the crank arm of the crank mechanism. A generator is connected to the crank wheel. Rotation of the crank wheel powers the generator to generate electricity output from the generator. The generator is connected to the electric circuit for powering the electric circuit. A leash is mounted on a leash spool. The leash spool is mounted within the light housing. The leash is retractable into the light housing and extendable from the light housing.

13 Claims, 5 Drawing Sheets

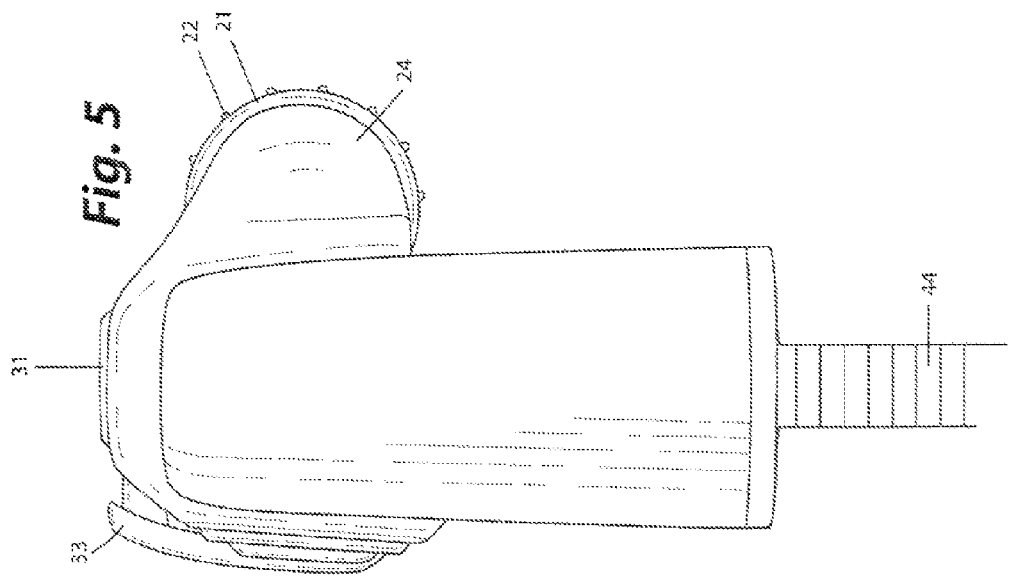
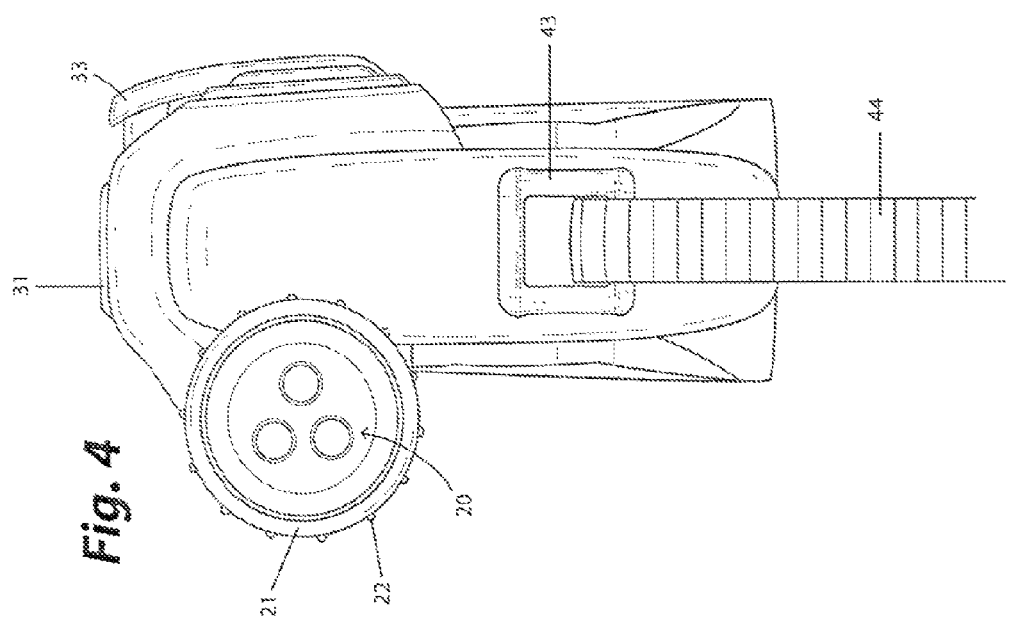

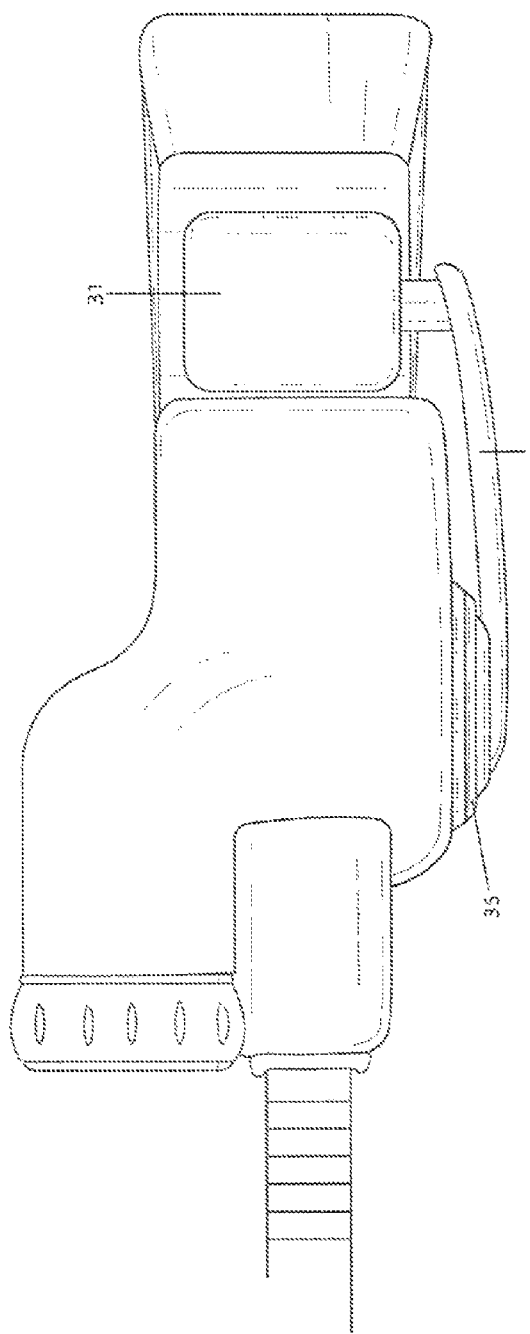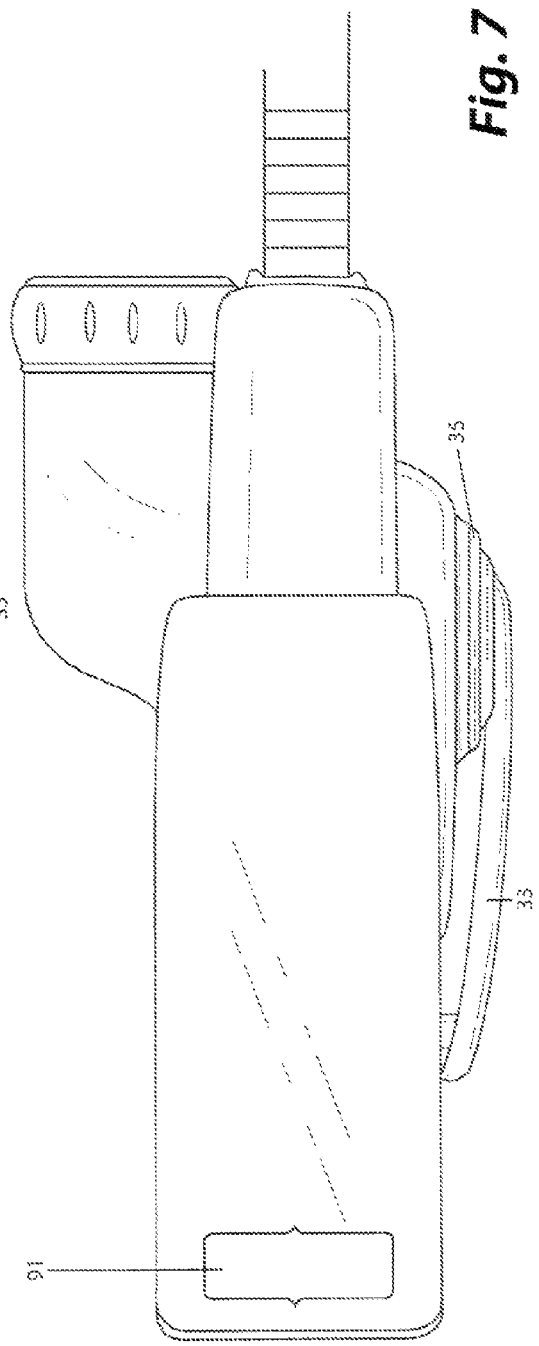

DYNAMO LIGHT

This application is a continuation in part of application Ser. No. 29/292,276 filed Oct. 6, 2007 now U.S. Pat. No. Des. 650,102 by same inventor Mr. Arthur Scott Pearson.

FIELD OF THE INVENTION

The present invention relates to a dynamo retractable leash light.

DISCUSSION OF RELATED ART

Dog walking can be a strenuous task, and may be performed during low light conditions. A variety of lights on a leash have been devised for dog walking convenience.

For example, in U.S. Pat. No. 7,207,296 to DiDonato, issued Apr. 24, 2007, the disclosure of which is incorporated herein by reference, a retractable leash device has a flashlight attached to the easing, which can provide the pet walker nighttime aid while walking and cleaning up after the pets. A device for detachably connecting a flashlight to a retractable leash removably inserts a flashlight along the top side of the elongate member as shown in U.S. Pat. No. 6,289,849 to Macedo et al. issued Sep. 18, 2001, the disclosure of which is incorporated herein by reference.

A combined pet leash and flashlight comprises a mechanical dispensing and retracting cord for the purpose of tethering, restraining and controlling a pet during a walk as shown in U.S. Pat. No. 5,887,550 to Levine et al. issued Mar. 30, 1999, the disclosure of which is incorporated herein by reference. For example, in U.S. Pat. Nos. 6,003,472 and 6,024,054 to Matt et al., issued Dec. 21, 1999 and Feb. 15, 2000 respectively, the disclosures of which are incorporated herein by reference, a retractable leash includes an integral light connected to the top front portion of the housing section with a rechargeable battery removably connected.

For example, in U.S. Pat. No. 5,762,029 to DuBois et al., issued Jun. 9, 1998, the disclosure of which is incorporated herein by reference, a retractable leash apparatus has a first housing section comprising a handle, a light connected to the top front portion of the housing section, a rechargeable battery removably connected and a receiving area. A combination leash apparatus for controlling the movements of an animal includes flexible elongate member and a tubular retaining member for removably retaining a flashlight as shown in U.S. Pat. No. 5,429,075 to Passarella et al. issued Jul. 4, 1995, the disclosure of which is incorporated herein by reference.

Unfortunately, people would rather be walking their dog than changing batteries on a dog leash. Additionally, recharging a battery by plugging in to a wall socket can be time consuming.

SUMMARY OF THE INVENTION

A retractable leash light has a light housing; and a handle formed on the light housing for handgrip. The light has an LED element and a switch. The light is connected to an electric circuit. A crank mechanism is mounted on the light housing, and the crank mechanism has a knob pivotally mounted to a crank arm of the crank mechanism. The crank mechanism also has a crank wheel mechanically connected to the crank arm of the crank mechanism. A generator is connected to the crank wheel. Rotation of the crank wheel powers the generator to generate electricity output from the generator. The generator is connected to the electric circuit for powering the electric circuit. A leash is mounted on a leash spool. The leash spool is mounted within the light housing. The leash is retractable into the light housing and extendable from the light housing.

A battery can also be connected to the electric circuit. A button can be connected to and actuating the leash spool. The button has a depressed position and a released position. The button in the depressed position releases a lock on the leash spool, and the button in the released position engages a lock on the leash spool. Optionally, a mechanical connection can be made between the crank wheel and the leash spool such that rotation of the leash spool rotates the crank wheel, so that rotation of the leash spool powers the generator. An indent can be formed on an external surface of the light housing. The indent receives the knob of the crank mechanism. The knob of the crank mechanism can be made is reversible and stowed in a reversed position. The handle can include a grip having a plurality of finger indents and a plurality of finger protrusions. The grip may further include a handle opening, and the handle opening can be located between the grip and in the leash spool.

DESCRIPTION OF THE DRAWINGS

FIG. 4 is a left side perspective view.
FIG. 5 is a right side perspective view.
FIG. 6 is a top view.
FIG. 7 is a bottom view.

Figure 1:
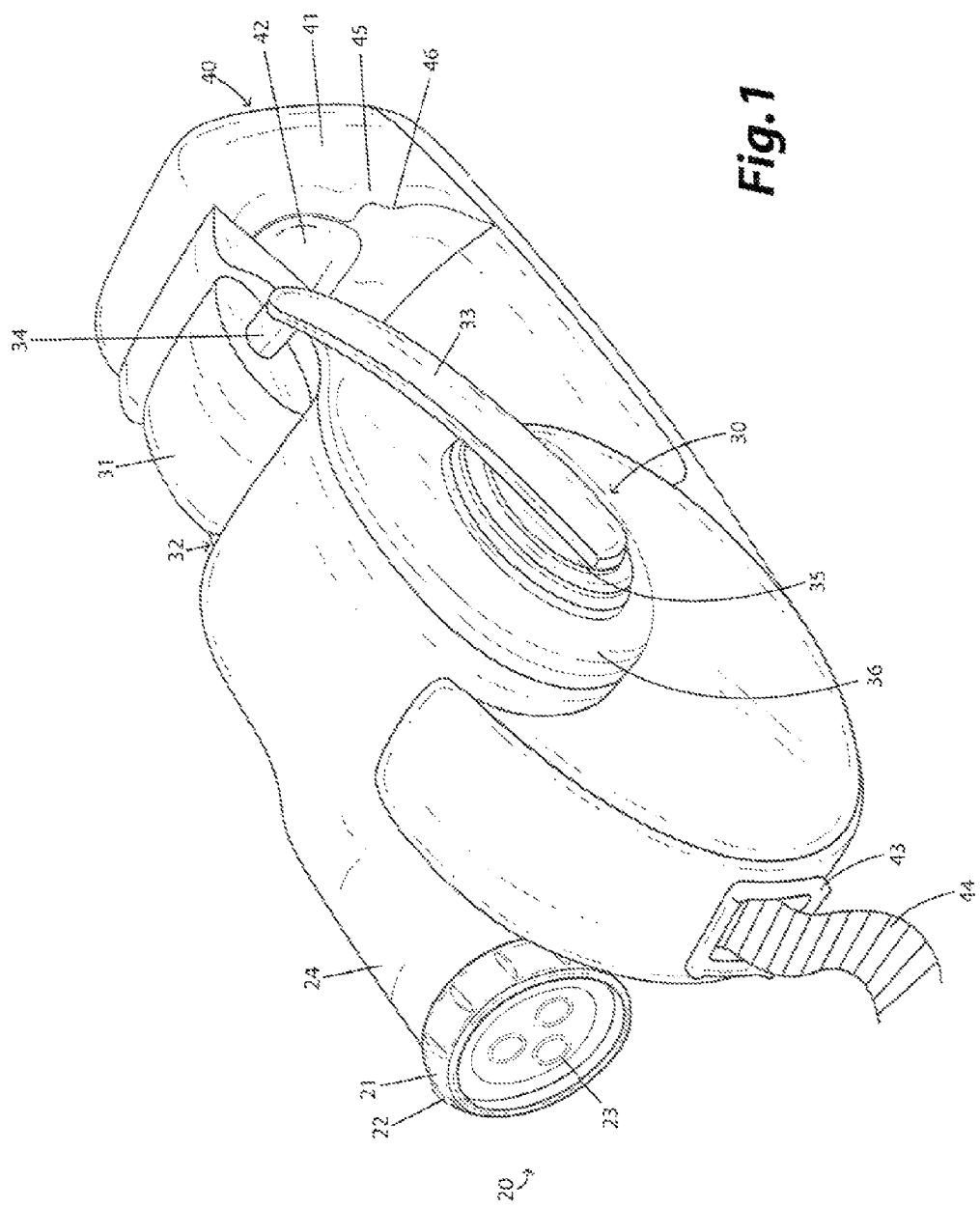
FIG. 1 is a perspective view.
Figure 2:
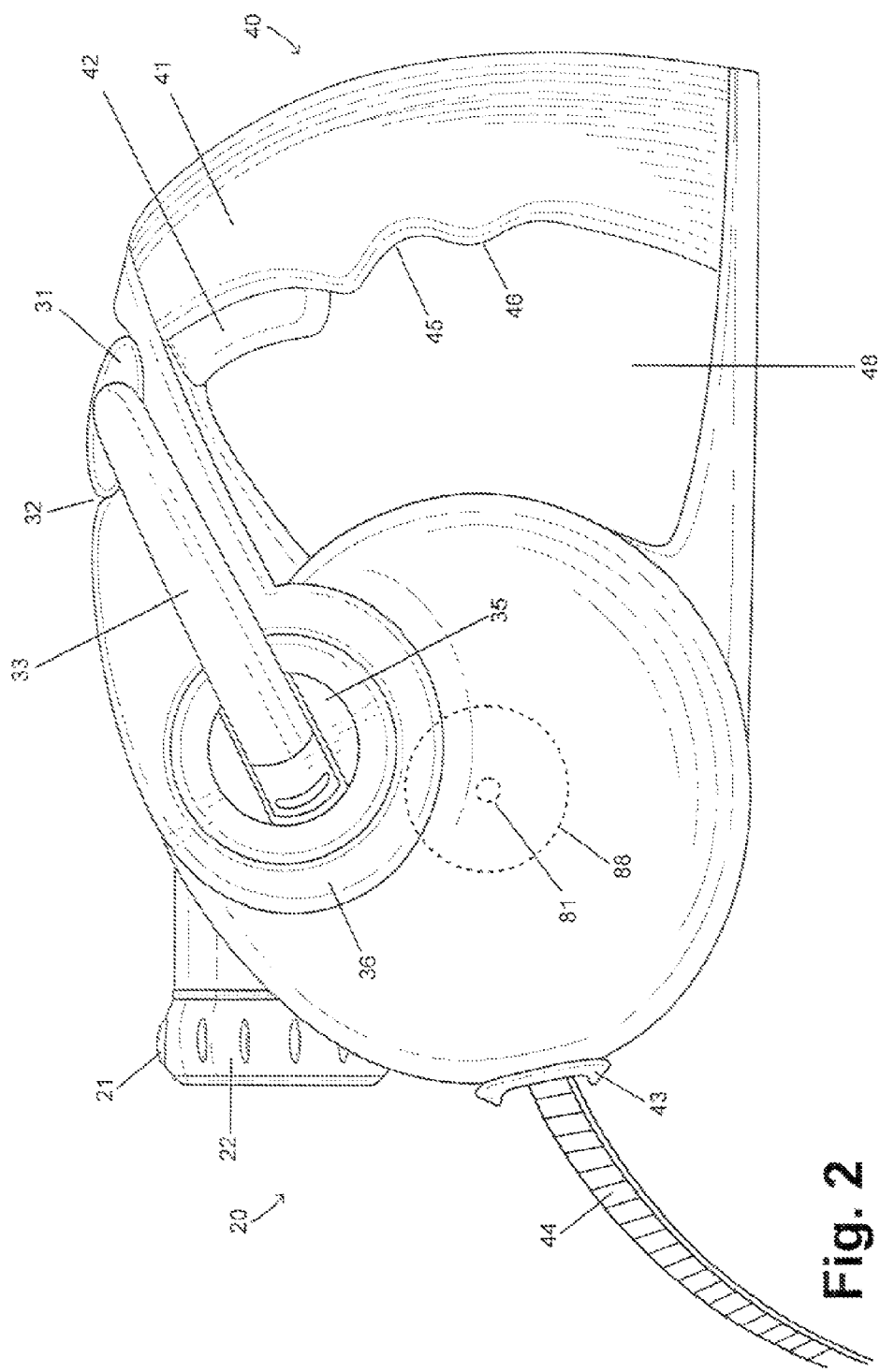
FIG. 2 is a front perspective view.
Figure 3:
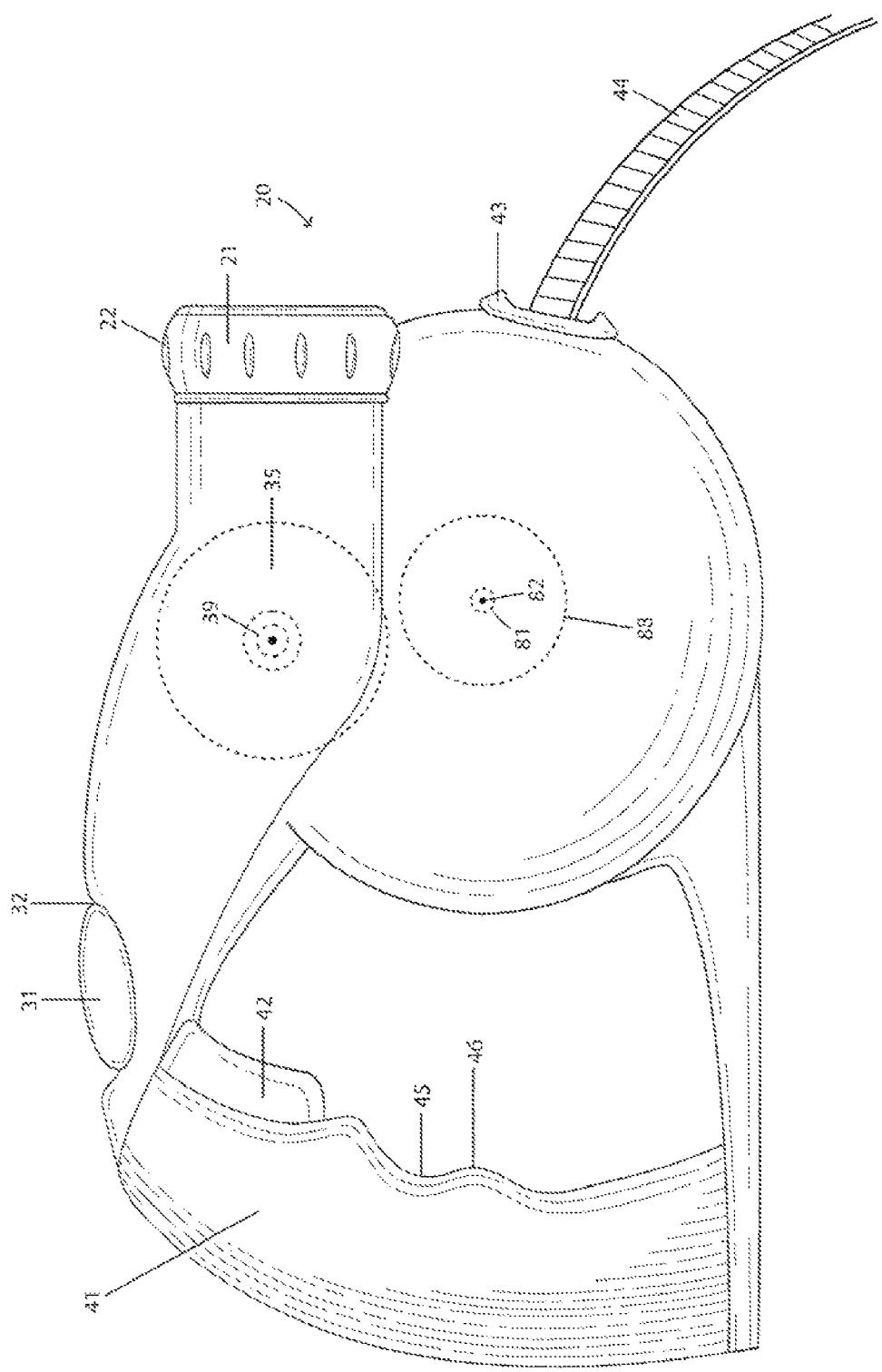
FIG. 3 is a rear side perspective view.

The following call out this of elements may be useful in referencing the elements of the drawings with the element numbers in the specification.

20 Light
21 Protrusion
22 Ring
23 Led Element
24 Light Housing
30 Crank mechanism
31 Knob
32 Indent
33 Arm
34 Swivel
35 Crank Wheel
36 Crank
39 Generator
40 Handle
41 Grip
42 Button
43 Flange
44 Leash
45 Finger Indent
46 Finger Protrusion
48 Handle Opening
81 Spool Bearing
82 Leash Spool Axis
88 Leash Spool
91 Battery Tray

DETAILED DESCRIPTION OF THE PREFERRED EMBODIMENT

The present invention includes a leash for dog walking. The leash 44 is connected to a light housing 24 which has a handle 40 and a light 20. A user has a crank 30 for handcrank generation of light, and the user has a button 42 for controlling retraction of the leash 44. The light housing has a light 20. The light is connected to an electric circuit, and the electric circuit may also include a generator 39 or battery for powering the electric circuit.

The light 20 preferably includes three or more LED elements 23. The light further includes a ring 22 around the circumferential edge of the light. The ring 22 can be mounted for free rotation. Protrusions 21 or indentations can be formed on the ring to allow a grip of the ring to provide and facilitate manual rotation of the ring relative to the light housing 24. The ring 22 can be a switch or focus adjustment or mode adjustment for the light. The ring 22 can be turned clockwise or counterclockwise which can turn on off or select a flashing mode of the light. The light is mounted on the light housing 24. The light housing contains other elements.

The housing 24 has a flange 43 around an opening from which a leash 44 protrudes. The light 20 mounted on the light housing 24 can extend as a protrusion from a left or right side of the light housing 24. The leash is a flexible flat fabric tape having a certain measure of elasticity. The flange provides friction free and tangle free interaction between the leash and the housing. At the external end of the leash, is attached a clip which can be attached to a collar which can be attached to a dog. The inside end of the leash is internal and inside the housing 24.

The internal end of the leash is connected to a leash spool 88. The leash spool 88 rotates around a spool hearing 81 that is connected to a leash spool axis 82. The spool bearing 81 is mounted to and rotates around the leash spool axis 82. The leash is extendable outside of the housing through the flange 43 during extension of the leash. The leash is retractable into the housing also through the flange 43 during a retraction of the leash. The leash spool 88 rotates for taking up the leash around the leash spool in a spiral configuration. The spool bearing 81 can be locked such as by a dilettante mechanism, actuated by the button 42. When the button is depressed, the leash spool 88 is extendable and retractable to allow a dog to run or return, and when the button is released, the leash spool 88 is fixed for maintaining a constant length of a free end of the leash. The free end of the leash external of the housing can be formed in a fabric tape having multiple numerous widthwise ridges along the length of the fabric tape the leash.

A crank mechanism 30 includes a knob 31 pivot mounted to a swivel 34. The swivel allows for a free rotation of the knob 31 relative to an arm 33. The arm 33 rotates for rotating a crank wheel 35. The knob 31 can be inverted in orientation and stowed in an indent 32. The crank 36 provides mechanical energy to a generator 39 which converts the mechanical motion into electricity. The electricity can be stored in a battery within the housing which can then be output to the light 20. The electricity could also be directly output to the light 20 bypassing a battery or omitting the battery. The user can remove the knob 31 from the indent 32 and flip the knob around to the opposite orientation so that it can be grasped. Flipping the knob optionally rotates the arm by about 180° for providing a lever for the user. In FIG. 1, the user rotates the crank to drive the generator held within the housing.

The generator 39 is optionally auxiliary powered by the leash spool when the leash spool engages with the crank wheel 35. The leash spool can be engaged with the crank wheel in a geared configuration where the leash spool has gearing on a circumferential periphery that engages with crank wheel circumferential gearing. Circumferential gearing can be used when such gearing is continuously applied. The leash spool can also be used selectively engaged with the crank wheel by a friction interface such that there is no gearing on a circumferential periphery of the leash spool and the crank wheel. The leash spool and the crank wheel may both have an engaging surface which mutually engage each other in a clutch configuration. The button 42 can be connected to a pull cord that selectively engages the crank wheel 35 toward the leash spool 88 when the button is depressed. When the dog pulls on the leash, the dog will rotate the leash spool 88 which is selectively clutch engaged to the crank wheel 35 which is connected to the generator 39 for outputting electrical power. Optionally, a belt can be placed around the crank wheel and the leash spool for facilitating clutch engagement between the two.

The battery is preferably held in the grip 41 and accessible by the battery tray 91. Access to the battery may allow a user to charge the rechargeable battery in an external charger before putting the batteries in the battery tray. The grip of 41 preferably includes a plurality of finger indent 42 and one or more finger protrusions 46 for providing an ergonomic grip. A handle opening 48 is preferably disposed between the grip 41 and the leash spool 88.

The invention claimed is:

1. A retractable leash light for a pet comprising;
   a. a light housing;
   b. a handle formed on the light housing for handgrip;
   c. a light including an LED element, wherein the light has a switch, wherein the light is connected to an electric circuit;
   d. a crank mechanism mounted on the light housing, wherein the crank mechanism has a knob pivotally mounted to a crank arm of the crank mechanism, wherein the crank mechanism further includes a crank wheel mechanically connected to the crank arm of the crank mechanism;
   e. a generator connected to the crank wheel, wherein rotation of the crank wheel powers the generator and generates electricity output from the generator, wherein the generator is connected to the electric circuit for powering the electric circuit;
   f. a leash mounted on a leash spool, wherein the leash spool is mounted within the light housing, wherein the leash is retractable into the light housing and extendable from the light housing; and
   g. a mechanical connection between the crank wheel and the leash spool, wherein rotation of the leash spool rotates the crank wheel and powers the generator.

2. The retractable leash light of claim 1, further comprising: an indent on an external surface of the light housing, wherein the indent receives the knob of the crank mechanism.

3. The retractable leash light of claim 1, wherein the knob of the crank mechanism is reversible and stowed in a reversed position.

4. The retractable leash light of claim 1, wherein the handle includes a grip having a plurality of finger indents and a plurality of finger protrusions, wherein the grip further includes a handle opening, wherein the handle opening is located between the grip and in the leash spool.

5. The retractable leash light of claim 1, further comprising: a battery connected to the electric circuit.

6. The retractable leash light of claim 5, further comprising: a button connected to and actuating the leash spool, wherein the button has a depressed position and a released position, wherein the button in the depressed position releases a lock on the leash spool, and wherein the button in the released position engages a lock on the leash spool.

7. The retractable leash light of claim 5, further comprising: an indent on an external surface of the light housing, wherein the indent receives the knob of the crank mechanism.

8. The retractable leash light of claim 5, wherein the knob of the crank mechanism is reversible and stowed in a reversed position.

9. The retractable leash light of claim 5, wherein the handle includes a grip having a plurality of finger indents and a plurality of finger protrusions, wherein the grip further includes a handle opening, wherein the handle opening is located between the grip and in the leash spool.

10. The retractable leash light of claim 1, further comprising: a button connected to and actuating the leash spool, wherein the button has a depressed position and a released position, wherein the button in the depressed position releases a lock on the leash spool, and wherein the button in the released position engages a lock on the leash spool.

11. The retractable leash light of claim 10, further comprising: an indent on an external surface of the light housing, wherein the indent receives the knob of the crank mechanism.

12. The retractable leash light of claim 10, wherein the knob of the crank mechanism is reversible and stowed in a reversed position.

13. The retractable leash light of claim 10, wherein the handle includes a grip having a plurality of finger indents and a plurality of finger protrusions, wherein the grip further includes a handle opening, wherein the handle opening is located between the grip and in the leash spool.

* * * * *